United States Patent Office 3,397,032
Patented Aug. 13, 1968

3,397,032
COLORATION OF POLYOLEFINS
John Mather and James Walter Stimpson, Harrogate, and William Alexander O'Neill, Ponteland, England, assignors to Imperial Chemical Industries Limited, London, England, a corporation of Great Britain
No Drawing. Continuation-in-part of applications Ser. No. 120,948, June 30, 1961, and Ser. No. 124,325, July 17, 1961. This application Aug. 3, 1964, Ser. No. 388,977
(Filed under Rule 47(a) and 35 U.S.C. 116)
12 Claims. (Cl. 8—100)

ABSTRACT OF THE DISCLOSURE

A process for improving the dye-receptivity of articles containing or consisting of stereoregular polyolefins characterized by formation within the article of a quaternized amine from an amine and a quaternizing agent which are separately introduced into the article and interact only with the article. Preferred quaternizing agents are esters of oxyacids of phosphorus and sulfur

---

This is a continuation-in-part of prior copending United States applications Ser. No. 120,948 filed June 30, 1961, and Ser. No. 124,325 filed July 17, 1961, both now abandoned.

This invention relates to the coloration of polyolefins and in particular provides a process whereby the dye-affinity of articles composed of stereoregular polyolefins may be improved.

Stereoregular polyolefins are polyolefins having a high degree of molecular symmetry. These polymers, notably isotactic and syndiotactic polypropylene, are now well known as a source of valuable shaped articles such as filaments, fibers and films. The hydrocarbon polymers are, however, hydrophobic in character and contain no groups which are chemically reactive toward dyestuffs. The coloration of articles composed of stereoregular polyolefins therefore presents a considerable problem since the application of dyestuffs by conventional methods is ineffective. It is important that this difficulty be overcome to facilitate the development and use of isotactic polyalphaolefins in textiles.

According to our invention we provide a process for improving the dye-receptivity of articles containing or consisting of stereoregular polyolefins characterized by formation within the article of a quaternized amine from an amine and a quaternizing agent which are separately introduced into the article and interact only with the article.

In one embodiment, the process comprises the inclusion in the article of an amine, either by assimilation or by the addition of the amine to the polymer composition from which the article is formed, and subsequent treatment of the article with a quaternizing agent.

By quaternizing agent is meant a reagent, conveniently in liquid form, which converts the amine to a quaternary ammonium salt, for example $(R_4N)^+X^-$, where R is an organic radical and $X^-$ is the salt-forming anion. The liquid reagent is preferably the undiluted quaternizing substance but may be a solution of this substance in an inert solvent. When the amine is added to the polymer composition prior to fabrication of the article, it is advantageous that the boiling point should be high in order to minimize loss by volatilization, for example, during melt extrusion. It is further advantageous to use an amine which is compatible with the polyolefin, and we have found tertiary amines containing long hydrocarbon chains (>6C) to be very suitable. The amine may also be in the form of a polymeric substance such as a poly(dialkylaminoalkylene acrylate).

While the covalent nature of amines and of quaternizing agents enables these substances to penetrate into polyolefins, the ionic quaternary salts formed become trapped in the structure and provide centers of affinity for many classes of dyestuffs but particularly for the important class of acid wool dyestuffs. Acid dyestuffs may be applied to articles of stereoregular polyolefins which have undergone the treatment of our invention by conventional methods including the use of carriers. Wash fastness of the colors has been very satisfactory.

In general, in this embodiment it has been found that between 1 and 10 percent by weight of quaternary ammonium salt is adequate to impart good dye affinity to articles.

This embodiment of the process has been applied most successfully to filaments and fibers of stereoregular polymers and copolymers of propylene, and it is possible to introduce and quaternize the amine at any stage in the course of spinning and drawing and to operate, if desired, in continuous fashion. It has, however, been observed that after drawing the movement of amine either into or out of the polyolefin is restricted and it is accordingly desirable to introduce the amine before drawing, i.e., before a high degree of molecular orientation has been created in the polymer.

Stereoregular polypropylene dyed in accordance with this embodiment may be used in the form of staple fiber in the following articles wherein improved dyeability is important:

Carpets
Blankets
"Woolen" garments such as dresses, coats and suits
Fur fabrics
Velvets
Furnishing fabrics such as pile fabrics for upholstery and repps for curtains
Knitted articles such as jersey fabrics and underwear
Non-woven fabrics such as linings and interlinings In the form of bulked filament yarn stereoregular polypropylene of improved dyeability is particularly useful in carpets and other floor coverings.

Improved dye-affinity thus achieved may also be useful in bulked yarn obtained by mixing staple fiber of stereoregular polypropylene with another staple fiber (such as cotton or viscose), e.g., before or after carding, and subsequently heating the blend under little or no tension. The bulking effect results from the high degree of shrinkage which occurs in the polypropylene fibers. The high shrinkage may be similarly utilized in the production of seersucker fabrics wherein polypropylene yarns are first combined with yarns composed of other materials.

According to another embodiment of the invention, we provide a process for the production of articles of polyolefins having improved dye-affinity characterized in that the article is formed from a stereoregular polyolefin to which an ester of an oxyacid of phosphorus or sulfur has been added and is subsequently treated with an amine which is assimilated and reacts with the ester of the oxyacid to form a quaternary ammonium salt. Both the ester of the oxyacid of phosphorus or sulfur and the amine should preferably be compatible with the polyolefin and for this purpose a low degree of polarity is advantageous. It is also desirable that the compound of phosphorus or sulfur should be high boiling and stable at the high temperatures commonly associated with melt extrusion processes. To meet the criteria of miscibility, stability and volatility, we have found substances of a fatty or aromatic character, for example, where the phosphorus, sulfur or amine groups are attached to a long hydrocarbon chain (>6C) or to a high molecular weight aromatic unit, to be very useful.

Among esters of oxyacids of phosphorus and sulfur which have been used in this embodiment of the process of our invention are compounds wherein at least one of the ester-forming groups is labile in character, e.g., benzyl, methyl and lower alkyl groups. Compounds of this type include phosphates having general formula

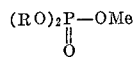

phosphonates

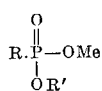

phosphinates

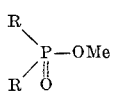

sulphonates R—$SO_3$Me and sulphates $ROSO_2$Me where R and R' are alkyl or aryl groups which may themselves contain substituents. The introduction of fatty substances is typified by our use of methyl esters of methylene dinaphthalene disulphonic acid and cetyl hydrogen sulfate.

In the amine after-treatment tertiary amines including trioctylamine, trinonylamine, tridecylamine and cetyldimethylamine have been successfully applied and their interaction with the ester of phosphorus or sulfur may be illustrated as follows:

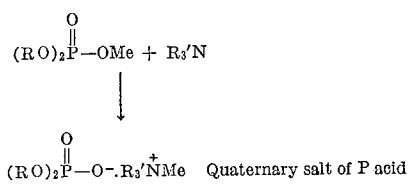

This form of the process has been applied most successfully to filaments and fibers of stereoregular polymers and copolymers of propylene. In this embodiment up to about 10 percent by weight of the phosphorus or sulfur compound is added to the polyolefin which is then spun at temperatures up to 150° C. above the melting point. The amine treatment may be integrated with subsequent drawing or stretching by passing the filaments through a bath containing the amine immediately before this step. In this way, penetration of the amine into the polymer is assisted by contact before orientation has taken place and by the passage of the yarn over a heated roll, pin or plate or through a hot tube as in conventional drawing techniques. The quaternization reaction may be accelerated by further heat treatment of yarns or the yarns may be kept at ordinary temperatures for the requisite period before excess amine is removed by washing.

Articles produced in accordance with this embodiment of the invention have affinity for many classes of dyestuffs but the improvement is most marked toward disperse and acid wool dyestuffs which may be successively applied by conventional methods. In general, the presence of between 2 and 5 percent by weight of ester or phosphorus or sulfur in the original polymer composition in conjunction with treatment with excess amine will adequately enhance the dye-receptivity of shaped articles for most purposes.

Stereoregular polypropylene dyed in this embodiment may be used in the form of staple fiber in the following articles wherein improved dyeability is important:

Carpets
Blankets
"Woolen" garments such as dresses, coats and suits
Fur fabrics
Velvets
Furnishing fabrics such as pile fabrics for upholstery and repps for curtains
Knitted articles such as jersey fabrics and underwear
Non-woven fabrics such as linings and interlinings In the form of bulked filament yarn stereoregular polypropylene of improved dyeability is particularly useful in carpets and other floor coverings.

Polypropylene fiber may be used in the form of blends with other fibers, notably wool, cotton, silk and synthetic fibers such as polyesters and polyamides and acrylic polymers.

Improved dye-affinity achieved in this embodiment may also be useful in bulked yarn obtained by mixing staple fiber of stereoregular polypropylene with another staple fiber (such as cotton or viscose), e.g., before or after carding, and subsequently heating the blend under little or no tension. The bulking effect results from the high degree of shrinkage which occurs in the polypropylene fibers. The high shrinkage may be similarly utilized in the production of seersucker fabrics wherein polypropylene yarns are first combined with yarns composed of other materials.

In outlets where good light fastness is necessary, it is advantageous to incorporate a stabilizer, such as a known U.V. absorber or oxygen acceptor, in polyolefin articles modified by our process, and this may be done at any stage in the manufacture of the article or the polyolefin of which it is composed.

The following examples in which all parts and percentages are by weight are provided only for the purpose of illustrating our invention. Examples 1–5 illustrate the first embodiment described above and Examples 6–10 illustrate the second embodiment.

Example 1

Isotactic polypropylene powder (9 parts) was intimately mixed with tri-n-octylamine (1 part). The mixture was melt spun at 260° C. The resultant fiber was immersed in a bath of dimethyl sulphate at 20° C. for 30 minutes. It was then washed with concentrated ammonia solution, followed by water. The treated fiber showed a strong affinity for acid dyestuffs, e.g., Carbolan Blue B (Color Index Acid Blue 138) and Azo Geranine 2G (C.I. 18050).

Example 2

Isotactic polypropylene fiber was immersed and drawn in cetyl dimethylamine at 80° C. before treatment with dimethyl sulphate at 20° C. for 30 minutes. The fiber, after washing with ammonia solution and water, showed similar affinity for acid dyestuffs to that obtained in Example 1.

Example 3

To isotactic polypropylene powder there was added 5% of poly(diethylaminoethyl methacrylate) and the composition was melt spun at 240° C. The fibers were immersed in dimethyl sulphate at 80° C. for 5 minutes and subsequently washed with ammonia and water before drawing. Good affinity was present toward disperse and acid dyestuffs such as Dispersol Fast Scarlet G (C.I. 11110) and Carbolan Yellow 3G (C.I. Acid Yellow 72).

Example 4

Isotactic polyproplyene filaments were immersed in trinonylamine at room temperature and subsequently drawn at 120° C. at draw ratio 5/1. The drawn yarn, containing about 1% of amine, was now immersed in dimethyl sulphate for twenty minutes, then washed with ammonia and water. The treated fibers showed a strong affinity for acid dyestuffs, e.g., Azogeranine 2G (C.I. 18050), Coomassie Fast Black BS (C.I. 26370), Coomassie Green 3G (C.I. 65005) and Coomassie Navy Blue 2RN (C.I. 26360).

Example 5

A sample of linear polyethylene ("Marlex") film was subjected to the procedure of Example 2 and showed substantial improvement in dye-affinity.

Similar results were achieved under conditions of Examples 1–4 when methyl iodide, formic acid/formaldehyde and tetramethylene dibromide were used as quaternizing agents in place of dimethyl sulphate.

Similar results were also obtained under the conditions of Examples 1–4 using a 20/80 (mol.) ethylene/propylene copolymer and fibers thereof in place of isotactic propylene polymer and fiber.

By comparison untreated fibers of polypropylene had little affinity for disperse dyestuffs and no affinity for acid dyestuffs and, while fibers containing unquaternized amine had appreciable dye-affinity, the colors were less intense and of inferior wash fastness particularly in undrawn yarn.

Examples 6–10

Isotactic polypropylene was intimately mixed with esters of oxyacids of phosphorus or sulfur in the quantities shown and the mixtures melt spun. The filaments were then moistened with amines and drawn over a heated pin using a draw ratio of about 3.5/1. After keeping for fifteen hours at ordinary temperatures of for two hours at 100° C., the filaments were chopped up and the fibers dyed in conventional manner with dyestuffs as shown in the table below.

| No. | Additive (Ester of P or S acid) | Amount, percent | Spinning Temp. (° C) | Amine after Treatment | Fiber Properties | |
|---|---|---|---|---|---|---|
| | | | | | Dyestuff and Color Index Reference | Shade |
| 6 | Methyl bis(p-methoxy-carbonyl phenyl) phosphate. | 5 | 260 | Cetyl dimethylamine | Azogeranine 2G (C.I. 18050) | Deep red. |
| 7 | Methyl toluene-p-sulphonate | 2 | 210–220 | Tri-n-octylamine | Coomassie Green 3G (C.I. 65005). | Very deep green. |
| 8 | Dimethyl naphtahlene 1, 5-disulphonate. | 2 | 210–220 | Tri-n-octylamine | Carbolan Crimson 3B (C.I. acid red 139). | Deep crimson. |
| | | | | Tridecylamine | Coomassie Navy Blue 2RN (C.I. 26360). | Very deep blue. |
| | | | | Cetyl dimethylamine | Azogeranine 2G (C.I. 18050) | Deep red. |
| 9 | Cetyl methyl sulphate | 2 | 210–220 | Trinonylamine | Carbolan Yellow 3G (C.I. acid yellow 72). | Deep yellow. |
| 10 | Methyl diphenyl phosphinate | 5 | 260 | Cetyl dimethylamine | Azogeranine 2G (C.I. 18050) Dispersol Fast Scarlet (C.I. 11110). | Deep red. Do. |

Similar results were obtained under the conditions of Examples 6–10 when a 10/90 (mol.) ethylene/propylene stereoregular copolymer was used in place of isotactic polypropylene and when the compositions were extruded in the form of film instead of filament.

We claim:

1. A process for the production of shaped polyolefin articles which have improved dye affinity comprising forming the article from an intimate mixture of a stereoregular polyolefin and an ester selected from the group consisting of methyltoluene-p-sulphonate; dimethyl naphthalene-1,5-disulphonate; cetyl methyl sulphate; methyl diphenyl phosphinate; and methyl bis(p-methoxy-carbonyl phenyl) phosphate and subsequently treating the article with an amine which reacts with the ester to form a quaternary ammonium salt.

2. A process according to claim 1 wherein the polyolefin article is a member of the group consisting of filaments, fibers and films of stereoregular homopolymers and copolymers of propylene.

3. A process according to claim 1 wherein the amine is a tertiary amine containing at least one hydrocarbon chain having more than six carbon atoms.

4. A process according to claim 1 wherein said ester is added to the stereoregular polyolefin in amount up to ten percent by weight and the article formed from the composition is treated with excess of an amine.

5. A process according to claim 4 in which said ester is added in an amount of two to five percent by weight.

6. A process according to claim 1 wherein filaments are spun from a composition comprising stereoregular polypropylene containing said ester in an amount up to ten percent by weight at temperatures up to 150° C. above the melting point and are treated with an amine prior to drawing and stretching.

7. A process according to claim 6 wherein the stereoregular polypropylene is isotactic polypropylene.

8. A process for the production of shaped polyolefin articles as set forth in claim 1 in which said ester is methyl bis(p-methoxy-carbonyl phenyl) phosphate.

9. A process for the production of shaped polyolefin articles as set forth in claim 1 in which said ester is methyl toluene-p-sulphonate.

10. A process for the production of shaped polyolefin articles as set forth in claim 1 in which said ester is dimethyl naphthalene-1, 5-disulphonate.

11. A process for the production of shaped polyolefin articles as set forth in claim 1 in which said ester is cetyl methyl sulphate.

12. A process for the production of shaped polyolefin articles as set forth in claim 1 in which said ester is methyl diphenyl phosphinate.

References Cited

UNITED STATES PATENTS

| | | | |
|---|---|---|---|
| 3,022,191 | 2/1963 | Cappuccio et al. | 8—55 |
| 3,083,118 | 3/1963 | Bridgeford | 8—100 XR |
| 3,107,228 | 10/1963 | Cappuccio et al. | 8—55 |
| 3,112,159 | 11/1963 | Cappuccio et al. | 8—55 |
| 3,116,966 | 1/1964 | Riboni et al. | 8—115.5 |
| 3,182,105 | 4/1965 | Bonivicini et al. | 8—55 |

NORMAN G. TORCHIN, *Primary Examiner.*

DONALD LEVY, *Assistant Examiner.*